United States Patent [19]

Livezey et al.

[11] Patent Number: 4,903,171

[45] Date of Patent: Feb. 20, 1990

[54] PANEL LIGHTING

[75] Inventors: Jerry L. Livezey, Celina; Everett J. Horst, Little Elm, both of Tex.

[73] Assignee: SFENA Corporation, Grand Prairie, Tex.

[21] Appl. No.: 364,527

[22] Filed: Jun. 12, 1989

Related U.S. Application Data

[63] Continuation of Ser. No. 245,347, Sep. 16, 1988, abandoned.

[51] Int. Cl.$^4$ ............................................. G01D 11/28
[52] U.S. Cl. ........................................ 362/26; 362/30; 362/31; 116/287
[58] Field of Search ................. 362/23, 26, 30, 31, 362/32; 116/287, DIG. 5

[56] References Cited

U.S. PATENT DOCUMENTS

| | | | |
|---|---|---|---|
| 1,739,954 | 12/1929 | Du Pont | 362/23 |
| 2,695,354 | 11/1954 | Neugass | 362/31 |
| 2,804,540 | 8/1957 | Columbus et al. | 362/32 |
| 2,858,417 | 10/1958 | Stevens et al. | 362/31 |
| 2,891,141 | 6/1959 | Lancucki et al. | 362/26 |
| 3,027,669 | 4/1962 | Hardesty | 40/130 |
| 3,029,334 | 4/1962 | Anderson et al. | 362/31 |
| 4,218,726 | 8/1980 | Fukasawa et al. | 362/23 |
| 4,257,084 | 3/1981 | Reynolds | 362/31 |
| 4,321,655 | 3/1982 | Bouvrande | 362/29 |
| 4,328,532 | 5/1982 | Smith | 362/19 |
| 4,658,690 | 3/1987 | Ohe | 350/321 |

FOREIGN PATENT DOCUMENTS

| | | |
|---|---|---|
| 586734 | 6/1955 | Canada . |
| 799142 | 12/1955 | United Kingdom . |
| 801526 | 1/1957 | United Kingdom . |

Primary Examiner—Stephen F. Husar
Attorney, Agent, or Firm—Harold E. Meier

[57] ABSTRACT

A panel for illuminating an object such as an instrument in at least one aperture therein while minimizing the amount of light directly transmitted toward the front of the panel. A portion of the panel is integrally formed of light transmitting material with at least one aperture having a cylindrical portion extending partially into the front of the panel towards the object to be viewed and outwardly beveled edges on at least a portion of the remainder of the aperture toward the object for emitting light and illuminating the object, the angle of the beveled edges and the depth of the cylindrical portion being selected such that transmission of the emitted light in the direction of the front of the panel is minimized.

24 Claims, 1 Drawing Sheet

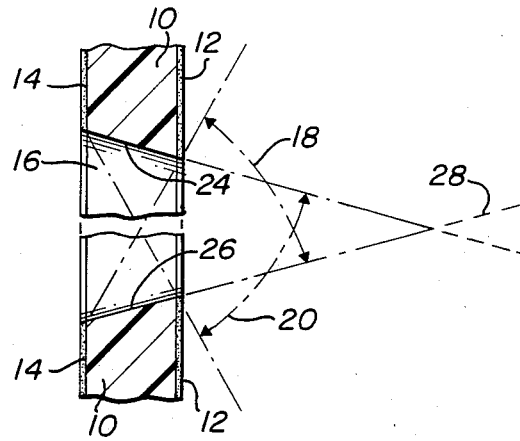
FIG. 1A
(PRIOR ART)
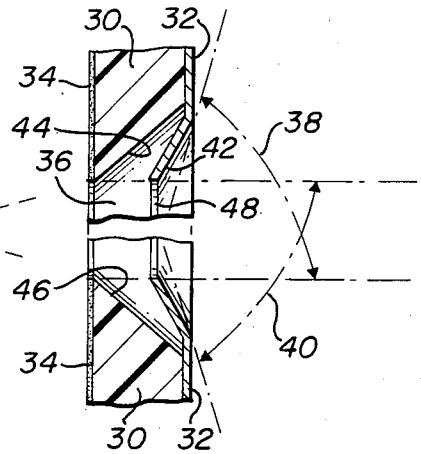
FIG. 1B
(PRIOR ART)
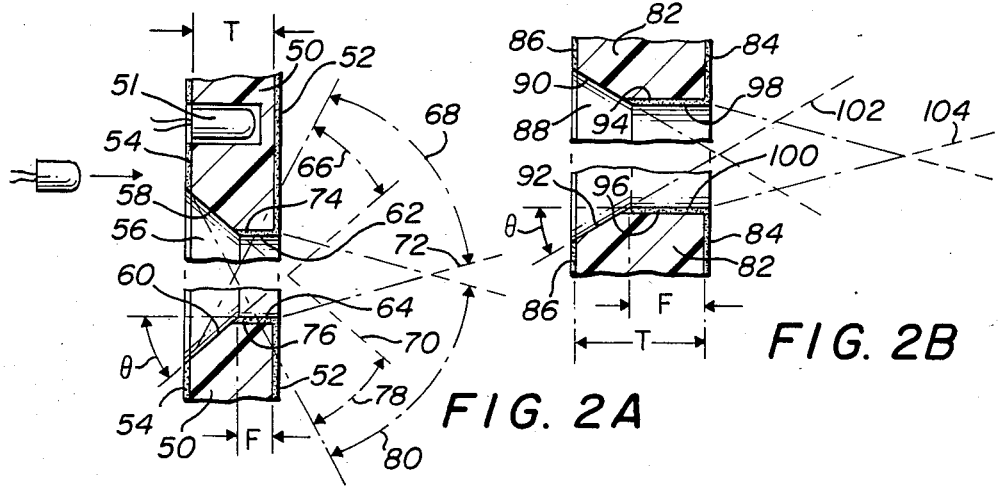
FIG. 2A
FIG. 2B
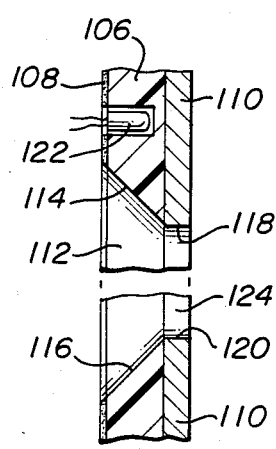
FIG. 3A
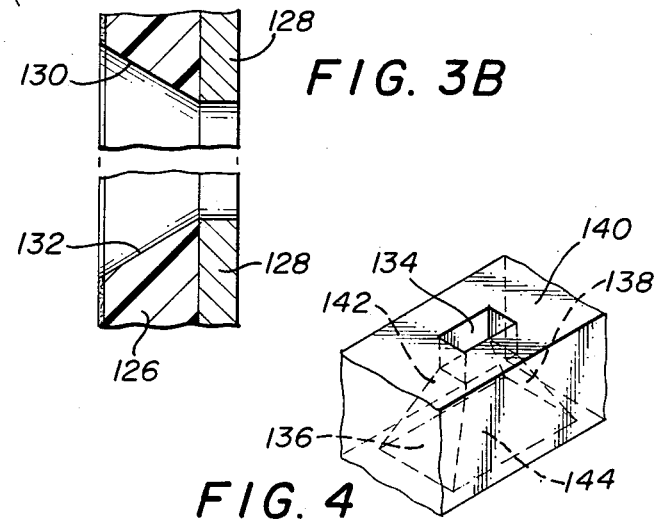
FIG. 3B
FIG. 4

PANEL LIGHTING

This application is a continuation of application Ser. No. 07/245,347 filed 9/16/88, now abandoned.

TECHNICAL FIELD

The present invention relates to improvements in panel illumination and, in particular, to panels for illumination of an object with at least one aperture therein for example an instrument illumination in an aircraft instrument panel.

BACKGROUND OF THE INVENTION

Various types of instrument panels are known in the prior art which have at least one aperture therein for receiving an instrument such as an aircraft instrument. For viewing the instruments at night, prior art panels have included a section formed of light transmitting material, a light source coupled to the section and opaque coverings on the inner and outer surfaces of the light transmitting section for causing transmission of light from the light source only in the plane of the panel. The area of the light transmitting section of the panel which immediately surrounds the instrument illuminates the face of the instrument in the aperture. However, this light transmitted from the area surrounding the aperture, and illuminating the face of the instrument, is directly visible to the observer and, thus, detracts from the observation of the instrument itself.

In order to overcome this disadvantage, prior art panels have the light transmitting area immediately surrounding the aperture beveled or sloped at an angle in order to reduce the direct transmission of the emitted light in the direction of the front of the panel.

In some cases in the prior art, a shield is placed on the panel surrounding the aperture in such a manner as to attempt to partially cover the beveled edges to reduce the amount of emitted light being transmitted directly to the front of the panel.

However, these prior art devices have not been entirely satisfactory inasmuch as a large amount of the emitted light is not blocked and is transmitted directly toward the front of the panel where it can be seen by the observer.

The present invention overcomes these disadvantages by providing an instrument panel of the type being integrally formed of light transmitting material and which is designed such that direct transmission of the emitted light in the direction of the front of the panel is minimized. This is accomplished by providing each aperture with a cylindrical portion extending partially into the front of the panel and beveled edges on at least a portion of the remainder of the aperture toward the object for emitting light and illuminating the object. The angle of the beveled edge and the depth of the cylindrical portion are selected such that direct transmission of the emitted light toward the front of the panel is minimized.

In one embodiment, the beveled edges of the aperture form a frusto-conical surface with the small diameter intersecting and in mating alignment with the cylindrical portion of the aperture which extends into the panel from the front.

In another embodiment, perpendicular sides on the aperture extend partially into the front of the panel toward the object to be viewed with beveled edges on at least a portion of the remainder of the aperture toward the object for emitting light and illuminating the object, the angle of the beveled edges and the length of the perpendicular sides being selected such that direct transmission of the emitted light in the direction of the front of the panel is minimized.

An important feature of the invention is the ratio of the length of the perpendicular sides of the aperture to the angle of the beveled edges which ratio varies with the thickness of the panel.

The invention also includes at least one frusto-conical shaped aperture in a supporting plate integrally formed of light transmitting material. The small diameter of the frusto-conical shaped aperture is at the front of the plate and the large diameter is at the back of the plate in the direction of the object to be illuminated to form a beveled surface for emitting light to illuminate the object. An opaque plate is mounted on the front of the light transmitting plate to cause light to be emitted only from the beveled surfaces, and a cylindrical aperture in the opaque plate is in mating alignment with the small diameter of the frusto-conical aperture to enable the object to be viewed while minimizing direct transmission of the emitted light toward the front of the panel.

SUMMARY OF THE INVENTION

Thus, the invention relates to an improved panel for illuminating an object in an aperture therein, the panel being integrally formed of light transmitting material and having a light source coupled to the panel and including means on the inner and outer surface of the panel for causing transmission of light from the source only in the plane of the panel, the improvement comprising perpendicular sides on the aperture extending partially into the front of the panel toward the object to be viewed, means on the perpendicular sides for preventing light from escaping therefrom, and beveled edges on at least a portion of the remainder of the aperture toward the object for emitting light and illuminating the object, the angle of the beveled edges and the depth or length of the perpendicular sides being selected such that direct transmission of the emitted light in the direction of the front of the panel is minimized.

The invention also relates to an improved method for illuminating an object in at least one aperture in a panel, the panel being integrally formed of light transmitting material having a light source coupled to the panel and means on the inner and outer surface of the panel for causing transmission of light from the source only in the plane of the panel, the improved method comprising the steps of extending a cylindrical aperture partially into the front of the panel towards the object to be viewed, preventing light from escaping from the walls of the cylindrical portion of the aperture, and providing outwardly beveled edges on at least a portion of the remainder of the aperture toward the object for emitting light and illuminating the object, the angle of the beveled edges and the length of the perpendicular sides being selected such that direct transmission of the emitted light in the direction of the front of the panel is minimized.

BRIEF DESCRIPTION OF THE DRAWINGS

A more complete understanding of the invention may be had by reference to the following detailed description when taken in conjunction with the accompanying drawings in which:

FIGS. 1A and 1B are examples of prior art light transmitting panels formed with light transmitting material and illustrating how the emitted light is directly transmitted toward the front of the panel;

FIGS. 2A and 2B are examples of the present invention utilizing light transmitting panels that are so constructed as to minimize the direct transmission of emitted light in the direction of the front of the panel;

FIGS. 3A and 3B are alternate embodiments of the present invention; and

FIG. 4 is an illustration of the use of the present invention with a panel aperture that is designed for use with an instrument that is other than cylindrical in shape.

DETAILED DESCRIPTION OF THE DRAWINGS

FIG. 1A illustrates a portion of a prior art instrument panel having a panel 10 integrally formed of light transmitting material and which has an opaque coating 12 on the front of the panel and an opaque coating 14 on the rear of the panel to prevent light from being emitted from the front or back of the panel 10 and to cause it to be transmitted in the plane of the panel 10 towards the aperture 16 for illuminating an instrument (not shown) which is attached to the rear of the panel 10 in aperture 16.

It will be seen in FIG. 1A that an observer in the front of the panel who is positioned anywhere in the angles designated by the arrows 18 and 20 will be able to receive direct light emitted from beveled surfaces 24 and 26 of the panel 10. Thus, an observer must sit within the area formed by dashed lines 28 in order to avoid seeing directly emitted light from the beveled surfaces 24 and 26.

FIG. 1B is a prior art panel such as that disclosed in U.S. Pat. No. 2,695,354 which utilizes a partial shield placed over the aperture to decrease the angle at which the light emitting beveled edges of the opening are visible to the viewer. Again, in FIG. 1B, the light transmitting portion 30 of the panel has opaque coverings 32 and 34 on the front and back of the panel, respectively, to prevent light from being emitted from either the front or the back of panel 30 and to cause it to be transmitted in the plan of panel 30 and to be emitted from beveled edges 44 and 46. A shield 42 is placed on the front of the panel over the aperture 36. Shield 42 also has an aperture 48 in alignment with aperture 46 thus, covering a portion of the beveled edges 44 and 46 from which light is emitted. However, as can be seen by the angles designated by the arrows numbered 38 and 40, directly emitted light can be received at any point in front of panel 30 from at least a portion of the beveled edges 44 and 46.

FIG. 2A is a partial cross-sectional view of the novel panel of the present invention which minimizes the amount of light directly emitted in the forward direction of the panel from the light emitting surfaces of the panel. As can be seen in FIG. 2A, panel 50 is formed of light transmitting material such as that well known in the prior art and again, as in the prior art, is coated on the front with an opaque layer 52 and on the back with an opaque layer 54 to contain the light within panel 50 and to cause it to be transmitted in the plane of the panel where it is emitted at beveled edges 58 and 60 to illuminate an instrument (not shown) mounted in aperture 56. It is to be understood, of course, that the construction of the panel 50 in FIG. 2A is exaggerated to illustrate the details of the invention. A light source 51 of any well known type, including lightbulbs or fiberoptics, couples light to the light transmitting material 50 for emission from beveled surfaces 58 and 60 to illuminate an instrument or other object mounted in aperture 56. Aperture 56 includes perpendicular sides 74 and 76 extending partially into the front of the panel toward the object to be reviewed with opaque means 62 and 64 on the perpendicular sides 74 and 76, respectively, to prevent light from escaping therefrom. The remainder of the aperture 56 toward the object to be viewed is formed of outwardly beveled edges 58 and 60 for emitting light and illuminating the object. The angle of the beveled edges 58 and 60 is selected in combination with the length of the perpendicular sides 74 and 76 such that the direct transmission of emitted light from beveled edges 58 and 60 in the direction of the front of the panel is minimized. Thus, because of perpendicular sides 74 and 76 of the aperture 56, directly emitted light can be seen from the front of the panel only in the angles designated by the numerals 66 and 78. In contrast, without perpendicular sidewalls 62 and 64 on aperture 56, directly emitted light from beveled edges as shown would be able to be seen from the front of the panel in the areas designated by arrows 68 and 80.

Thus, with a prior art panel, an observer in the front of the panel would have to sit in the area bounded by the dashed lines 72 in order to avoid seeing directly emitted light from beveled edges 58 and 60. With the present invention, however, an observer seated anywhere within the area bounded by dashed lines 70, would not be able to see any directly emitted light from beveled edges 58 and 60. Thus, it can be seen in FIG. 2A that directly emitted light toward the front of the panel 50 from beveled edges 58 and 60 is significantly minimized over that transmitted from prior art panels.

It will be noted in FIG. 2B that the ratio of the length of the perpendicular sides 94 and 96 to the angle, $\theta$, of the beveled edges 90 and 92 varies with the thickness of the panel 82. Thus, because the panel 82 of FIG. 2B has a greater thickness, T, then that shown in FIG. 2A, the perpendicular sides 94 and 96 of aperture 88 extend further into the panel 82 than that shown in FIG. 2A and thus, the angle, $\theta$, of the beveled edges 90 and 92 in FIG. 2B is less than the angle, $\theta$, formed by beveled edges 58 and 60 of FIG. 2A. It will be noted in FIG. 2B, that the dashed lines 102 representing the boundary or area in which directly emitted light from beveled edges 90 and 92 cannot be observed from the front of the panel is much larger than the area bounded by dashed lines 104 which represent the area in the prior art in which an observer would not be able to see directly emitted light from beveled edges 90 and 92.

Thus, it can be seen from FIGS. 2A and 2B that by utilizing an aperture which has perpendicular sides extending partially into the front of the panel toward the object to be viewed and outwardly beveled edges on at least a portion of the remainder of the aperture toward the object for emitting light to illuminate the object, the angled, beveled edges, in conjunction with the length of the perpendicular sides, can be selected such that direct transmission of the emitted light in the direction of the front of the panel is minimized.

The perpendicular sides of the aperture may be of a cylindrical shape extending into the front of the panel toward the object to be viewed with a frusto-conical shaped aperture in the remainder of the panel. The small diameter of the frusto-conical aperture is toward the front of the plate in mating alignment with the cylindrical aperture and the large diameter at the back of the plate in the direction of the object to be illuminated forms an outwardly beveled surface for emitting the light to illuminate the object.

FIG. 3A is an alternate version of the present invention which includes a plate 106 integrally formed of light transmitting material with a light source 122 of any well known type for coupling light to the light transmitting plate 106. An opaque coating 108 on the back of the plate 106 prevents light from escaping therefrom. Beveled edges 114 and 116 on at least a portion of aperture rear 112 form the widest portion of the aperture at the back of the plate 106 and the narrowest portion of the aperture at the front of plate 106. The beveled edges 114 and 116 emit light to illuminate an object in aperture 112 at the back of the plate 106. An opaque covering plate 110 is mounted on the front of the light transmitting plate 106 to cause the light in plate 106 to be emitted only from the beveled edges 114 and 116. An aperture 124 in opaque plate 110 has vertical walls 118 and 120 which are in superimposed and mating alignment with the narrowest portion of the aperture 112 in the front of light transmitting plate 106 to enable the object to be viewed. Thus, the length or thickness of walls 118 and 120 of opaque plate 110 in combination with the beveled edges 114 and 116 of light transmitting plate 106 provide the advantages set forth earlier in relation to FIGS. 2A and 2B.

As indicated in relation to FIG. 2A and FIG. 2B, the opaque layers 52 and 84, respectively, are well known and may be formed of coats of dull, opaque paint or lacquer or may be formed of opaque sheets of dark colored vinyl resin. The thickness, however, is small when compared to the thickness of the panels 50 and 82 in FIGS. 2A and 2B. However, in FIG. 3A, the thickness of opaque panel 110, which may be of any suitable dark colored material, is significant in relation to the thickness of the light transmitting panel 106 and must be of sufficient thickness that, when combined with the beveled edges 114 and 116, it will provide the advantages of minimizing the direct transmission of light from the beveled surfaces 114 and 116 in the direction of the front of the panel.

FIG. 3B again illustrates that when the thickness of the light transmitting panel 126 increases the thickness of the separate opaque layer 128 also increases and the angle of the beveled surfaces 130 and 132 with respect to the horizontal in FIG. 3B decreases. Thus, again, it is illustrated that the depth (length) of the perpendicular sides of the aperture into opaque layer 128 varies inversely with the angle of the beveled surfaces 130 and 132 varies with the thickness of the panel 126. The greater the depth of the perpendicular sides, the smaller is the angle of the beveled surface.

The apertures shown in FIGS. 2A, 2B, 3A and 3B are typically formed of a cylindrical portion and a frusto-conical portion with the small diameter of the frusto-conical portion at the front of the plate in mating alignment with the diameter of the cylindrical aperture. However, as shown in FIG. 4, the apertures may be formed of any shape such as rectangular shape. Thus, vertical sidewalls 134 in FIG. 4, form a rectangular aperture extending partially into the panel 140 with beveled edges 136 and 138 on only the end portions of the remainder of the aperture toward the object for emitting light and illuminating the object. The sides 140 and 142 of the remainder of the aperture could be beveled if desired.

As can be seen in FIGS. 2A, 2B, 3A and 3B, a method of illuminating an object mounted in at least one aperture in a panel is disclosed comprising the steps of transmitting light in at least a light transmitting portion of the panel only in the plane of the panel, preventing light from being emitted from a first portion of the aperture shaped as a cylinder extending partially into the front of the panel, and emitting light from a second portion of the aperture formed with beveled edges and extending from the first cylindrical portion outwardly to the rear of the panel to illuminate the object in the aperture and minimize the direct transmission of light toward the front of the panel.

Although the invention has been described and illustrated in detail, it is to be understood that the same is by way of illustration and example only and is not to be taken by way of limitation. The spirit and scope of this invention are to be limited only by the terms of the appended claims.

I claim:

1. In a panel for illuminating an object in at least one aperture therein, said panel being integrally formed of light transmitting material, having a light source coupled to the panel and including means on the inner and outer surface of the panel for causing transmission of light from said source only in the plane of said panel, the improvement comprising:

said at least one aperture having a cylindrical portion extending partially into the front of said panel toward the object to be viewed;

means on the walls of the cylindrical portion for preventing light from escaping therefrom; and outwardly beveled edges on at least a portion of the remainder of said aperture toward said object for emitting light and illuminating said object, the angle of the beveled edges and the thickness of the cylindrical portion being selected such that transmission of the emitted light in the direction of the front of the panel is minimized.

2. Apparatus as in claim 1 wherein said aperture beveled edges form a frusto-conical surface with the small diameter in mating alignment with said cylindrical portion of said aperture.

3. In a panel for illuminating an object in an aperture therein, said panel being integrally formed of light transmitting material, having a light source coupled to the panel, and including means on the inner and outer surface of the panel for causing transmission of light from said source only in the plane of the panel, the improvement comprising:

parallel sides on said aperture extending partially into the front of the panel toward the object to be viewed;

means on the parallel sides for preventing light from escaping therefrom; and outwardly beveled edges on at least a portion of the remainder of the aperture toward the object for emitting light and illuminating the object, the angle of the beveled edges and the length of the parallel sides being selected such that transmission of the emitted light in the direction of the front of the panel is minimized.

4. The improved panel of claim 3 wherein the ratio of the length of the parallel sides to the angle of the beveled edges varies with the thickness of the panel.

5. An improved panel for illuminating an object in at least one aperture in said panel comprising:

a plate integrally formed of light transmitting material;

means for coupling light to the light transmitting material;

means on the back of the light transmitting plate for preventing light from escaping therefrom;

at least one frusto-conical shaped aperture in said plate with the small diameter at the front of said plate and the large diameter at the back of said plate in the direction of the object to be illuminated to form an outwardly beveled surface for emitting said light to illuminate said object;

an opaque plate mounted on the front of the light transmitting plate to cause the light to be emitted only from the beveled surfaces; and a cylindrical aperture in the opaque plate in mating alignment with the small diameter of the frusto-conical aperture to enable the object to be viewed while minimizing direct transmission of the emitted light toward the front of the panel.

6. An improved panel as in claim 5 wherein the angle of the beveled surface and the thickness of the opaque plate are selected to minimize the direct transmission of light from the beveled surface in the direction of the front of the panel.

7. The improved panel of claim 6 wherein the ratio of the thickness of the opaque plate and the angle of the beveled surface varies with the thickness of the light transmitting plate.

8. An improved panel for illuminating an object in at least one aperture in said panel comprising:

a first plate integrally formed of light transmitting material;

means for coupling light to the light transmitting material;

means on back of the first plate for preventing light from escaping therefrom;

beveled edges on said aperture with the widest portion of said aperture at the back of said first plate and the narrowest portion of said aperture at the front of said first plate, said beveled edges emitting said light to illuminate the object in the aperture at the back of the first plate;

a second opaque plate mounted on the front of the first plate to cause the light to be emitted only from the beveled edges; and an aperture in the opaque plate in superimposed and mating alignment with the narrowest portion of the aperture in the first plate to enable the object to be viewed while minimizing direct transmission of the emitted light toward the front of the panel.

9. An improved panel as in claim 8 wherein the angle of the beveled edges and the thickness of the opaque plate are selected to minimize the direct transmission of light from the beveled edges in the direction of the front of the panel.

10. The improved panel as in claim 9 wherein the ratio of the thickness of the opaque panel to the angle of the beveled edges varies with the thickness of the first plate.

11. A method of illuminating an object mounted in at least one aperture in a panel while minimizing the direct transmission of light toward the front of said panel comprising the steps of:

transmitting light only in the plane of at least a light transmitting portion of said panel;

preventing light from being emitted from a first portion of said aperture shaped as a cylinder extending partially into the front of said panel; and emitting light from beveled edges in a second portion of said aperture in the light transmitting portion of said panel, said beveled edges extending from said first cylindrical portion outwardly to the rear of said panel to illuminate said object; the angle of said beveled edges and the depth of said first cylindrical portion being selected such that transmission of the emitted light in the direction of the front of the panel is minimized.

12. A method as in claim 11 including the step of forming said aperture beveled edges with a frusto-conical surface having its smaller diameter in mating alignment with the cylindrical portion of said aperture.

13. A method of illuminating an object mounted in at least one aperture in a panel while minimizing the direct transmission of light toward the front of said panel comprising the steps of:

transmitting light only in the plane of at least a light transmitting portion of said panel;

preventing light from being emitted from a first portion of said aperture formed by parallel sides extending partially into the front of said panel towards the object to be viewed; and emitting light from beveled edges on at least a portion of the remainder of said aperture toward the object to be viewed for illuminating said object, the angle of said beveled edges and the length of the parallel sides being selected such that transmission of said emitted light in the direction of the front of said panel is minimized.

14. The improved method of claim 13 further including the step of varying the ratio of the length of the parallel sides to the angle of the beveled edges with the thickness of the panel.

15. A method of illuminating an object mounted in at least one aperture in a panel while minimizing the direct transmission of light toward the front of said panel comprising the steps of:

transmitting light in at least a light transmitting portion of said panel;

preventing light from escaping from the back of said light transmitting portion of said panel;

emitting light from a beveled surface on at least one frusto-conical shaped aperture in said light transmitting portion, said frusto-conical shaped aperture having a small diameter at the front of said light transmitting portion and the large diameter at the back of said light transmitting portion to form said beveled surface for emitting light to illuminate said object;

mounting an opaque plate on the front of said light transmitting portion to cause said light to be emitted only from said beveled surface; and mating a cylindrical aperture in the opaque plate in superimposed alignment with the small diameter of the frusto-conical aperture to minimize direct transmission of the emitted light toward the front of the panel.

16. An improved method as in claim 15 including the step of selecting the angle of said beveled surface and the thickness of said opaque plate to minimize the direct transmission of light from the beveled surface in the direction of the front of the panel.

17. The improved method of claim 16 further comprising the step of varying the ratio of the thickness of the opaque plate and the angle of the beveled surface with the thickness of the light transmitting portion of the panel.

18. A method of illuminating an object mounted in at least one aperture in a panel while minimizing the direct transmission of light toward the front of said panel comprising the steps of:
  transmitting light in the plane of at least a light transmitting portion of said panel;
  preventing light from escaping from the back of said light transmitting portion;
  illuminating said object in said aperture with light emitted from a beveled edge on said aperture with the widest portion of said aperture at the back of said light transmitting portion and the narrowest portion of said aperture at the front of said light transmitting portion of said panel;
  mounting an opaque plate on the front of said light transmitting portion of said panel to cause light to be emitted only from said beveled edge; and
  superimposing an aperture in the opaque plate in mating alignment with the narrowest portion of the aperture in the light transmitting portion to minimize the direct transmission of light from said beveled edges while viewing said object.

19. An improved method as in claim 18 further comprising the step of selecting the angle of said beveled edges and the thickness of said opaque plate so as to minimize the direct transmission of light from said beveled edges in the direction of the front of said panel.

20. The improved method of claim 19 further comprising the step of varying the ratio of the thickness of the opaque panel to the angle of the beveled edges with the thickness of the light transmitting portion of said panel.

21. In a panel for illuminating an object in at least one aperture therein, said panel being integrally formed of light transmitting material, having a light source coupled to the panel and including means on the outer surface of the panel for causing transmission of light from said source substantially in the plane of said panel, the improvement comprising:
  said at least one aperture having a cylindrical portion extending partially into the front of said panel toward the object to be viewed; and
  outwardly beveled edges on at least a portion of the remainder of said aperture toward said object for emitting light and illuminating said object, said aperture beveled edges forming a frustro-conical surface with the small diameter in mating alignment with said cylindrical portion of said aperture, the angle of the beveled edges and the thickness of the cylindrical portion being selected such that transmission of the emitted light in the direction of the front of the panel is minimized.

22. The improved panel of claim 21 wherein the ratio of the length of the parallel sides to the angle of the beveled edges varies with the thickness of the panel.

23. An improved panel as in claim 21 wherein the angle of the beveled edges and the thickness of the cylindrical portion are selected to minimize the direct transmission of light from the beveled edges in the direction of the front of the panel.

24. The improved panel of claim 21 wherein the ratio of the thickness of the cylindrical portion and the angle of the beveled edges varies with the thickness of the panel.

* * * * *